United States Patent
Wisotzky et al.

[11] 3,914,492
[45] *Oct. 21, 1975

[54] SUEDE-LIKE MATERIAL OF CELLULAR RESIN HAVING TENSILE-RUPTURED CELLS

[75] Inventors: Reuben Wisotzky, Lexington; Richard E. Petersen, Concord, both of Mass.

[73] Assignee: Pandel-Bradford, Inc., Lowell, Mass.

[ * ] Notice: The portion of the term of this patent subsequent to Jan. 9, 1990, has been disclaimed.

[22] Filed: Nov. 3, 1972

[21] Appl. No.: 303,476

Related U.S. Application Data

[63] Continuation of Ser. No. 108,193, Jan. 20, 1971, Pat. No. 3,709,752, which is a continuation of Ser. No. 661,459, Aug. 17, 1967, abandoned.

[52] U.S. Cl. ................ 428/151; 156/254; 156/344; 428/236; 264/45
[51] Int. Cl.².. B32B 3/00; B32B 5/18; B29D 27/00; D04H 11/00
[58] Field of Search ............. 161/116, 159, 125, 67, 161/89, 109; 156/254, 344, 79, 78; 117/9, 10, 11; 264/45

[56] References Cited
UNITED STATES PATENTS

| | | | |
|---|---|---|---|
| 2,961,332 | 11/1960 | Nairn | 117/11 |
| 3,041,193 | 6/1962 | Hamway et al. | 117/11 |
| 3,167,464 | 1/1965 | Cook | 156/254 |
| 3,239,365 | 3/1966 | Petry | 156/78 X |
| 3,240,855 | 3/1966 | Voelker | 156/254 X |
| 3,340,335 | 9/1967 | Winchcombe | 264/45 |
| 3,567,535 | 3/1971 | Noda et al. | 156/254 X |
| 3,615,971 | 10/1971 | Perry | 156/344 X |
| 3,776,790 | 12/1973 | Harrington et al. | 156/78 X |

*Primary Examiner*—Philip Dier
*Attorney, Agent, or Firm*—Richard P. Crowley

[57] ABSTRACT

A suede-like plastic material characterized by a suede surface, and comprising a sheet material having a cellular plastic layer thereon characterized by an irregular undulating surface uniformly composed of tensile-ruptured open cells with a fiber-like plastic surface, said cells having a random, irregular edge structure.

9 Claims, 4 Drawing Figures

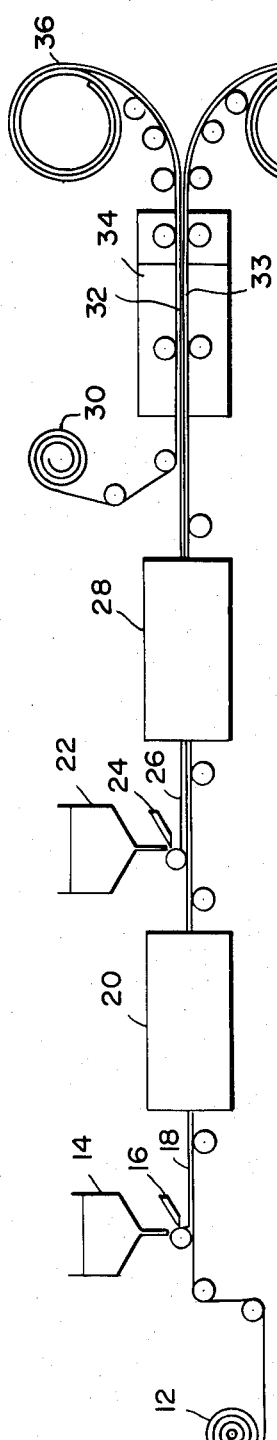
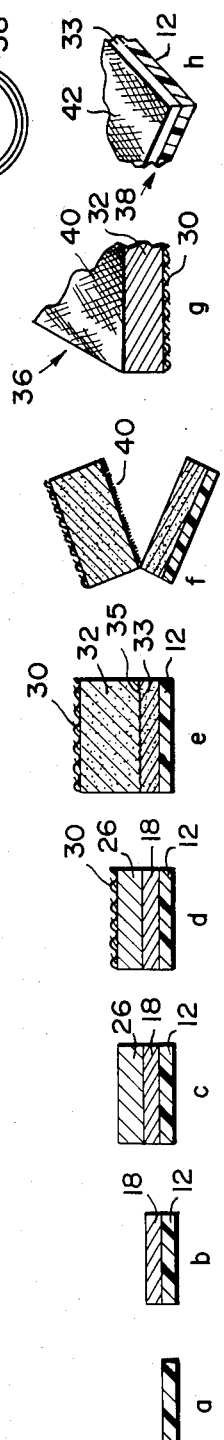
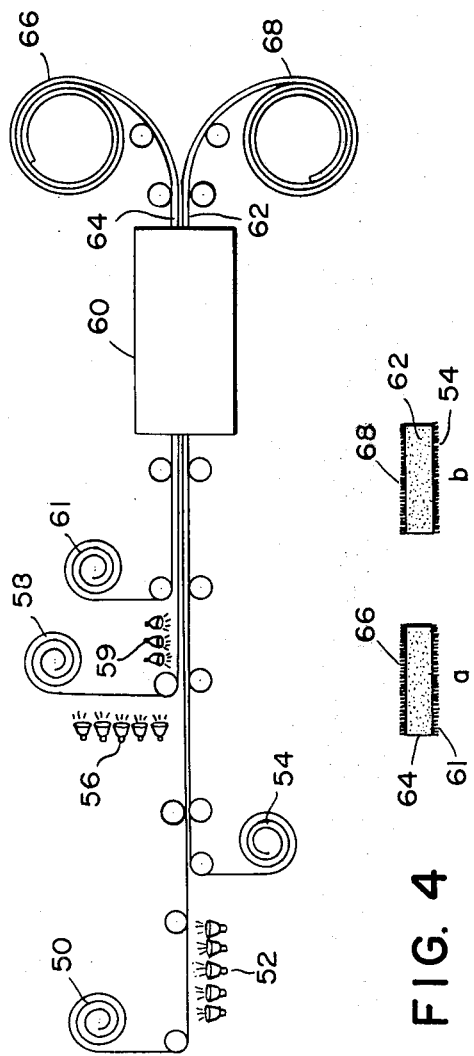
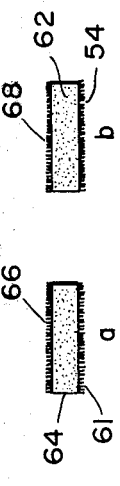
FIG. 1
FIG. 2
FIG. 3
FIG. 4

SUEDE-LIKE MATERIAL OF CELLULAR RESIN HAVING TENSILE-RUPTURED CELLS

This application is a continuation of application Ser. No. 108,193, filed Jan. 20, 1971 (now U.S. Pat. No. 3,709,752), which application is a continuation of U.S. Ser. No. 661,459, filed Aug. 17, 1967 (now abandoned).

BACKGROUND OF THE INVENTION

Normally the surface of plastic sheeting such as vinyl chloride resin sheet is smooth and often shiny in appearance. It is often desirable to prepare plastic surfaces which have a different appearance, feel or texture such as for uses as a decorative covering or for utilitarian purposes. It is particularly desirable to prepare a soft flexible plastic coated fabric which has the feel and appearance of more expensive suede-like material such as leather. In the past attempts to obtain such a plastic suede-like material and a suede-like surface have not been wholly successful. Some methods have been directed toward separate or additional treatments of the surface of the plastic material to obtain the desired appearance. Such additional treatment has often resulted in a product of less than acceptable appearance, while additional treatment has resulted in a more expensive operation than commercially acceptable. For example, U.S. Pat. No. 3,041,193 issued June 26, 1967, to E. G. Hanway; et al., describes a method of making a suede-like plastic sheeting material by preparing a cellular polyvinyl coating on a fabric and then abrading the exposed surface of the cellular layer to produce a suede-like finish. The patent is hereby incorporated by reference in its entirety in this application. Another technique which also requires an abrasion operation is set forth in U.S. Pat. No. 3,312,586 issued Apr. 4, 1967, to T. W. Barlow.

SUMMARY OF THE INVENTION

Our invention relates to a suede-like plastic material composed of a sheet material having a cellular plastic coating thereon, the surface of the coating characterized by an undulating or irregular surface which is generally uniformly composed of ruptured open cells with short fiber-like resin surface which presents a suede appearance to the surface and which material is flexible and has a soft hand. The exposed cell edges are rough and irregular and therefore provides the fiber-like characteristic similar to leather.

Our material is prepared by bonding together the resin surfaces of a first and a second resin coated sheet material, at least one layer, thereof, containing a blowing agent and, thereafter heating the bonded laminate to decompose the blowing agent to create one or two cellular layers in the laminate. The laminate is then delaminated by stripping apart the bonded surfaces of the first and second sheet materials to provide the finished product which is a sheet material having a cellular layer thereon with a suede-like surface. In general the stripping operation occurs across the entire planar surface of the cellular layer wherein a tensile gradient or a plane of tensile discontinuity occurs between the surface of the first and second sheet material. This controlled delamination provides for the controlled rupture of the cells of the one or both cellular layers to impart an irregular or undulating natural suede-like surface to the product. The tensile gradient or discontinuity between the bonded surface may be created by a number of various methods including for example, degree of expansion, variation in the resin formulation and composition of the resin layers such as the variation of silica content, the type and molecular weight of the resin, and the amount and type of plasticizer employed. Other methods include without limitation the use of physical methods such as employing a temperature gradient across the laminate layers and the temperatures at which the lamination and/or delamination occurs. Alternatively, an adhesive-coated substrate is applied to a cellular layer. The adhesive chosen is one with sufficient internal strenghth to remove the top of the cellular layer upon delamination thereby providing the open-celled suede-like structure.

Various types of suede-like and other rough finishes may be imparted to one or more of the surfaces of the cellular sheet material by varying the tensile or fiber-forming properties of the resin or the temperature at which the delamination occurs. For example, out stripping operation permits a more natural undulating surface effect to be obtained since the stripping operation unlike a synthetic cutting operation or an abrasion operation provides a random irregular surface which may vary in thickness from a plane surface for example, from 1 to 5 mils. This is to be contrasted with an abrasion operation for example, wherein the abrading wire wheel gives a generally level regular surface across the entire fabric and destroys and reduces a portion of the surface in the operation. In our method, both surfaces which have been split open by tensile rupture have the desirable suede-like surface. Further by varying the temperature at which controlled delamination occurs, the amount of short fibers present and surface appearance of our material may be varied. Where a lower temperature of delamination is employed there is a tendency for the resin surfaces to form more a fibrous surface, that is the resin tends to stretch more before breaking apart from the plane of tensile discontinuity or the bonding plane between the first and second sheet materials. At higher temperatures, there is usually less tendency for the resin fibers to be pulled out in length, since the thermoplastic fibers tend to break quickly and, therefore, form short fiber lengths on the surface thereby giving a different appearance to the sheet material surface. Of course, the selection of the particular temperature or temperature range to use in the stripping operation depends upon the tupe surface desired and character of the resin and formulation employed.

One preferred method of preparing the material is to employ a first and second sheet material both of which contain a blowable plastic layer thereon and both of different thicknesses, so that upon the subsequent formation of the cellular layers and the controlled delamination, both portinas of the laminate, that is, the first and second sheet materials, both have surfaces of a suede-like appearance.

The term "tensile ruptured," as used therein is intended to refer to the cleavage of the cells at the weakest structural point to form ragged-edged, irregularly-shaped, open cells providing a random irregular surface.

It is, therefore, an object of our invention to provide a new and unique cellular plastic sheet material which is soft and flexible and has a surface appearance of a natural suede-like finish.

Another object of our invention is to provide a method or preparing a suede-like plastic sheet material and particularly a cellular vinyl chloride resin coated fabric material having a suede-like surface by both a plastisol and calendering technique.

BRIEF DESCRIPTION OF THE DRAWING

FIG. 1 is a schematic illustration of one method of preparing a resin coated fabric in accordance with our invention which fabric has a suede-like cellular surface.

FIG. 2a–h illustrates cross-section views of enlarged fragmentary materials at various steps of the process as shown in FIG. 1.

FIG. 3 is a schematic illustration of another method of preparing suede-like materials of our invention by the use of calendered resin sheets.

FIG. 4a and b, is a representative cross-section view of an enlarged fragmentary material as prepared by the method set forth in FIG. 3.

DESCRIPTION OF THE PREFERRED EMBODIMENTS

A cellular vinyl chloride resin coated fabric having a suede-like cellular surface may be prepared by the use of resin formulations such as those set forth in Tables 1 and 2, hereafter, by the process shown in FIG. 1, while a process employing calendered sheets of vinyl chloride resin is shown more particularly in FIG. 3. In the method as shown in FIG. 1, a backing sheet of a thin inexpensive casting type paper 12 has a plastisol cast onto the surface at a thickness of approximately two to ten mils for example, 3 to 6 mils. The vinyl chloride resin plastisol from a source 14 is cast or coated onto the surface by the use of doctor blade 16 or other coating technique. The typical plastisol formulation is set forth in Table 1 and is composed primarily of a low or medium molecular weight resin with an excess of plasticizer that is it is compounded to exhibit low hot film strength. The backing sheet 12 with the thin plastisol coating 18 is then passed through an oven 20 and heated to a temperature sufficient to gel and/or blow the vinyl chloride resin; typically, a temperature of 255°–350°F., e.g., 300°F. The time in the oven is adjusted to provide a substantially tack-free coating surface to the gelled layer 18. After removal from oven 20, another vinyl chloride resin plastisol formulation such as that set forth in Table II, is cast coated from a source 22 by a doctor blade 24 to form a relatively thick layer 26 on the surface of the gelled vinyl chloride layer 18. The plastisol layer 26 is cast in a thickness to form about 5 to 50 mils, preferably 10 to 30 mils, and has been compounded employing a high molecular weight polymer with lower plasticiser levels so as to provide a higher film hot strength than layer 18. This formulation is selected to provide the coated layer having the more natural suede-like appearance.

TABLE I

| INGREDIENTS | PARTS BY WEIGHT |
| --- | --- |
| Low molecular weight polyvinyl chloride resin (EXON 605)[1] | 50 |
| Diluent polyvinyl chloride resin (PLIOVIC M-70)[2] | 50 |
| Filler (calcium carbonate) | 15 |
| Plasticizer | |
| a) Monomeric (nonyl octyl decyl adipate | 12.0 |
| (diisooctyl phthalate | 44.0 |
| b) Polymeric (SANTICIZER 845)[3] (containing isooctyl expoxy talloate) | 4.0 |
| Blowing agent (Kempore 200)[4] azodicarbonamide | 1.75 |

TABLE I-Continued

| INGREDIENTS | PARTS BY WEIGHT |
| --- | --- |
| Stabilizer (Actofoam-R-3)[5] mixture of zinc and potassium fatty acid salts in dioctylphthalate | 0.75 |
| TOTAL | 177.50 |

[1]A trademark of Firestone
[2]A trademark of Goodyear
[3]A trademark of Monsanto
[4] and [5]A trademark of National Polychemicals, Inc.

TABLE II

| INGREDIENTS | PARTS BY WEIGHT |
| --- | --- |
| Vinylchloride resin - dispersion grade (GEON 121)[1] | 37.0 |
| (GEON 222)[2] | 17.0 |
| (PLIOVIC WO)[3] | 9.0 |
| Diluent resin (PLIOVIC M-70)[4] | 35.0 |
| Plasticizer | |
| (nonyl octyl phthalate | 12.0 |
| a) monomeric (Butyl dioctyl phthalate | 10.0 |
| (diisoocyl phthalate | 29.0 |
| b) polymeric plasticizer for vinyl chloride resins | |
| (SANTICIZER 845)[5] | 3.0 |
| blowing agent (KEMPORE 200)[6] azodicarbonamide | |
| Stabilizer - activator (ACTAFOAM R-3)[7] | 2.0 |
| TOTAL | 154.0 |

[1] and [2]A trademark of Goodrich
[3]A trademark of Goodyear
[4]A trademark of Goodyear
[5]A trademark of Monsanto
[6] and [7]A trademark of National Polychemicals, Inc.

Backing sheet 12 with gel layer 18 and plastisol layer 26 is then passed to a hot air oven 28 wherein the layer 26 is heated to a temperture, as in oven 20, that is sufficiene to gel the plastisol or decompose the blowing agent therein. The temperature of oven 28 is typically from 300° to 400°F. Of course, the desired vinyl chloride resin layer 26 may be the same or a different color than layer 18 to provide any desired contrast. The same resins or plasticizers may also be employed in both layers provided that the amounts or other compounds are employed to provide formulations with different properties. Where similar formulations are used then a temperature gradient may be used to provide strippable layers.

The gelling time in oven 28 should not be sufficient to provide a tack-free coating in the surface of layer 26. Layer 18 is normally gelled to a tack-free surface coating so that there is a reduction of migration of the layer 26 into layer 18 which may blur the plane of tensile discontinuity and the controlled delamination which is later desired. However, the top surface of layer 26 should be slightly tacky after emerging from oven 28. A backing fabric 30 such as a woven cotton or nonwoven material is then placed on the top surface of the tacky layer 26 and pressed into adhering contact with the surface. If the top surface of layer 26 is essentially tack-free, the fabric 30 may not adhere to the surface, while if layer 26 has been insufficiently gelled, a porous cotton fabric might wick up a portion of the plastisol or plasticizer and become discolored.

The laminate comprising backing sheet 12, gel layer 18, gel layer 26, and backing fabric 30 is then heated in oven 34 to a temperature sufficient to decompose the blowing agent in layer 18 and 26 to create several blown or cellular layers 32 and 33 which layers are bonded together by surface of tensile discontinuity 35.

Typically, the laminate should be heated to a temperature of from about 375° to 435°F until substantially all of the blowing agents has decomposed.

The cellular laminate, after removal from oven 34 is then delaminated by stripping the backing fabric 30 with cellular layer 32 from cellular layer 33 and the backing sheet 12. The stripping operation may be accomplished by a rapid or gradual pulling apart of the respective coated sheet materials. In the process described, the stripping is carried out just after emersion of the laminate from oven 34 so that the temperature of stripping is approximately 275°F to 350°F. Of course, if desired, the laminate may be stored as the gelled laminate or blown laminate and the stripping operation carried out as required. As the backing fabric 30 is pulled in one direction and the backing sheet 12 is another, the laminate will delaminate along the general planar surface of contact between layer 33 and 32 where there is tensile gradient or tensile discontinuity between the resin layers created by the formulations used. The higher hot resin strength of the layer 26 will create a natural suede-like open rupture cell surface on the cellular layer 32 while surface of cellular layer 33 may be more grainy in nature.

FIG. 2 shows representative cross-sectional views of the backing sheet layer 12, layer 18 and 26, backing fabric 30, cellular layers 32 and 33 as the material is processed through the corresponding steps of FIG. 1. FIGS. 2g and h illustrate the irregular surfaces 40 and 42 as prepared by the controlled stripping which surface 40 represents a suede-like appearance.

Our invention has been described in particular employing a backing fabric and a backing sheet, however, it is recognized that the backing sheet and backing fabric may be the same or different materials. For example, woven and non-woven natural and synthetic sheet materials may be employed as desired, such as woven sheet materials like cotton, wool and silk, hemp, felt, or knitted materials or fabrics which are extensible and stretchable in one or more directions. Fibrous materials would include glass fibers, kraft paper, rayon, nylon, polyethylene, polypropylene, urethanes, acrylics or other synthetic fibrous material such as polyesters or combinations thereof. In particular our invention has been illustrated by employing smooth sheet material, however, it is also recognized that the backing sheet and/or fabric may be embossed, for example, having a decorative design thereon, to impart a decorative suede-like surface appearance. Further, the sheet material may have one or more other coatings thereon such as primer or bonding or decorative coatings. In the process described, the cellular-coated backing sheet 38 which has only a thin cellular layer thereon may then be reused several times as the backing sheet 12 in the process or if desired, it may be employed for covering or decorative or other purposes where a suede-like or roughened finish is desirable.

FIG. 3 is a schematic illustration of a process employing calendered vinyl chloride resin sheet material. For example, the calender sheet material employed in this embodiment of our invention may be that described in the U.S. Pat. No. 2,964,799 issued Dec. 20, 1960 to P. E. Roggi, et al., which patent is hereby incorporated by reference in its entirety in this application. As shown, a thin calendered polyvinyl chloride sheet 50 containing a blowing agent (for example a calendered sheet prepared as in Table I) is unrolled and one surface heated, such as by infrared heaters 52, to a soft condition, but insufficiently to decompose the blowing agent therein. The tacky surface is then placed in contact with the surface of the backing sheet 54 to adhere thereto after passing through a pair of contacting rollers. Another polyvinyl chloride calendered sheet material 58 formulated as in Table 2 also have its one surface heated to a tacky condition by infrared heaters 56 which surface is then pressed against the opposite surface through calender rolls to calender sheet 50. Of course if desired, the top surface of sheet 50 could be treated or both surfaces heated prior to bonding of sheets 50 and 58.

Also, 58 may be a calendered laminate comprising a backing fabric having a calendered sheet secured thereto of a vinyl chloride resin containing a blowing agent or as illustrated a separate backing fabric 61 may be passed into contact with the top surface of the calendered vinyl chloride resin 58 after rendering the surface tacky through heaters 59. The bonded laminate of backing fabric 61, calendered sheet 58, calendered sheet 50 and backing fabric 54 is then passed to an oven 60 wherein the laminate is heated to a temperature of about 400° to 425°F. to decompose the blowing agents in both calendered sheets layers to create blown or cellular layers 62 and 64. Upon emergence from the oven at a temperature of about 340°-360°F backing fabric 61 with layer 64 stripped away across substantially the surface plane of contact from backing fabric 54 and cellular layer 62 to provide two separate cellular coated fabrics each having a suede-like cellular surface finish.

FIG. 4 is a cross-sectional representation of the new suede-like material prepared by the calender method as set forth in FIG. 3 wherein the suede-like surface 66 and 68 are similar in nature. In this illustration the calendered sheets are approximately equal in thickness, but as before of different resin strength so that at the stripping temperature used, there is created a tensile gradient across the surface of bonding thereby permitting the controlled stripping. However, in this case two separate products are obtained, one having a mirror image suede-like finish relative to the other.

In general, the ratio of thickness of the layer may vary from 1:10 to 10:1 preferably 5:1 to 1:5. Our invention has been illustrated with particular resin formulations, however, as set forth in both Hemway, et al., and Roggi, et al., patents, various resins as well as monomeric and polymeric plasticizers blowing agents, fillers and other materials may be employed in such resin formulations. In particular, our invention has been described wherein both the backing sheet and the fabric sheet have employed blowable vinyl chloride resin layers. However, it is also recognized that the backing sheet need not have a blowable vinyl chloride resin layer, but that a vinyl chloride resin with or without a blowing agent or another resin coating may be employed on the backing sheet to provide the control stripping and delamination from the cellular vinyl chloride resin layer making up the suede-like product. The selection of the resin formulation to employ on the backing sheet requires that the resin form a bond with the blowable resin formulation from which it is to be later stripped, yet the bond must be such as to be easily strippable therefrom after blowing of the blowable layer essentially along the plane of bonding. Various thermoplastic or thermosetting resins may accordingly then be used on the backing sheet with or without the blowing agents to provide the suede coated materials of this invention.

What is claimed is:

1. A suede material which comprises: a sheet material and a layer of a cellular thermoplastic resin thereon, the surface of the cellular layer characterized by:
   a. an irregular undulating surface;
   b. tension-ruptured open cells, said cells having a random, rough, irregular edge structure and generally uniformly composed over the surface; and
   c. fibers composed of the thermoplastic resin and of short fiber length to form a fibrous suede surface, the tension-ruptured cells and the short length fibers providing a suede appearance to the surface.

2. The material of claim 1 wherein the sheet material is a flexible fibrous sheet material.

3. The material of claim 1 wherein the thermoplastic resin is a vinyl-chloride resin.

4. The material of claim 1 wherein the sheet material is a paper sheet with the cellular layer bonded thereto.

5. The material of claim 1 wherein the random irregular surface of the cellular layer varies in thickness from a plane surface from 1 to 5 mils.

6. The material of claim 1 wherein the thermoplastic resin has a hot-resin strength which permits delamination of the cellular layer at a temperature of about 275° to 350°F.

7. The material of claim 1 wherein the sheet material comprises a flexible fibrous sheet material, a layer of a flexible solid thermoplastic resin bonded to the sheet material, and a layer of a cellular thermoplastic resin bonded to the solid resin layer.

8. The material of claim 7 wherein the solid and cellular layers comprise a plasticized vinyl-chloride resin.

9. A suede material which comprises:
   a. flexible woven fibrous sheet material;
   b. a layer of flexible solid vinyl-chloride resin bonded to one surface of the sheet material; and
   c. a layer of a flexible cellular vinyl-chloride resin bonded to the surface of the solid layer, the surface of the cellular layer characterized by
      i. an irregular undulating surface;
      ii. open cells, said cells having a random, rough, irregular edge structure and generally uniformly composed over the surface; and
   c. fibers composed of the vinyl-chloride resin and of short fiber length to form a fibrous suede surface, the tension-ruptured cells and the short length fibers providing a suede appearance to the surface.

* * * * *